United States Patent [19]

Hubert

[11] Patent Number: 4,763,540

[45] Date of Patent: Aug. 16, 1988

[54] MECHANICAL COUPLING DEVICE FOR TWO PARALLEL SHAFTS ALLOWING ROTATION THEREOF IN A 2/1 RATIO

[75] Inventor: Charles Hubert, Meudon La Foret, France

[73] Assignee: Thomson-CSF, Paris, France

[21] Appl. No.: 23,260

[22] Filed: Mar. 9, 1987

[30] Foreign Application Priority Data

Mar. 14, 1986 [FR] France ................. 86 03650

[51] Int. Cl.[4] ................. F16H 21/44; F16H 53/00
[52] U.S. Cl. ................. 74/96; 74/470; 74/567; 74/569
[58] Field of Search ................. 74/54, 96, 516, 518, 74/470, 567, 569

[56] References Cited

U.S. PATENT DOCUMENTS

| 432,386 | 7/1890 | Emmons | 74/128 |
|---|---|---|---|
| 2,611,292 | 9/1952 | Chandler | 74/84 |
| 2,741,132 | 10/1956 | Goldberg | 74/54 |
| 3,353,417 | 11/1967 | Nebendorf et al. | 74/54 |
| 3,491,605 | 1/1970 | MacDonald | 74/96 |
| 4,109,540 | 8/1978 | Habiger | 74/96 |
| 4,111,062 | 9/1978 | Callaghan | 74/96 |

FOREIGN PATENT DOCUMENTS

| 45-28657 | 9/1970 | Japan | 74/96 |
|---|---|---|---|
| 29149 | of 1897 | United Kingdom | 74/516 |
| 229142 | 11/1969 | U.S.S.R. | 74/54 |

OTHER PUBLICATIONS

*Ingenious Mechanisms for Designers & Inventors,* vol. III, Holbrook L. Horton, 1956, pp. 251–257.
*Ingenious Mechanisms for Designers & Inventors,* vol. IV, J. A. Newell et al., 1967, pp. 251–252.
*Mechanisms, Linkages & Mechanical Controls,* N. P. Chironis, 1965, p. 62.

*Primary Examiner*—Lawrence Staab
*Attorney, Agent, or Firm*—Cushman, Darby & Cushman

[57] ABSTRACT

A device is provided for mechanically coupling two parallel shafts together allowing rotation thereof in a 2/1 ratio in an angular sector defined, by producing a very rigid connection without lost motion, with a minimum of parasite torque and insensitive to environmental vibrations. It includes a first place mounted on a shaft and having two guide elements and a second piece mounted on a shaft having two arms provided with flat surfaces on which the guide elements move. The center of these latter, as well as the axis of rotation of the second shaft, are on a circle centered on the axis of rotation of the first shaft. Preferably, one of the pieces is made in two parts, one being integral with the associated shaft and the other freely mounted on this shaft, and a return spring holds said guide elements against the flat surfaces, these elements being formed by ball bearings.

9 Claims, 5 Drawing Sheets

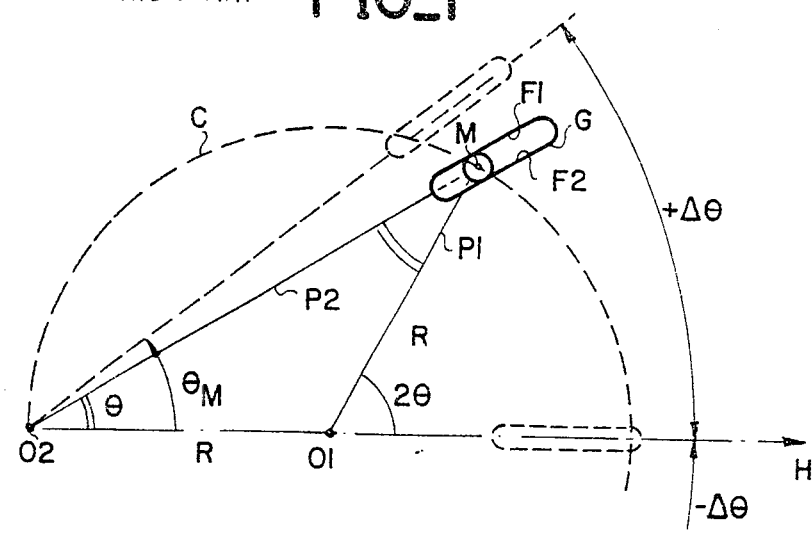
PRIOR ART FIG_1
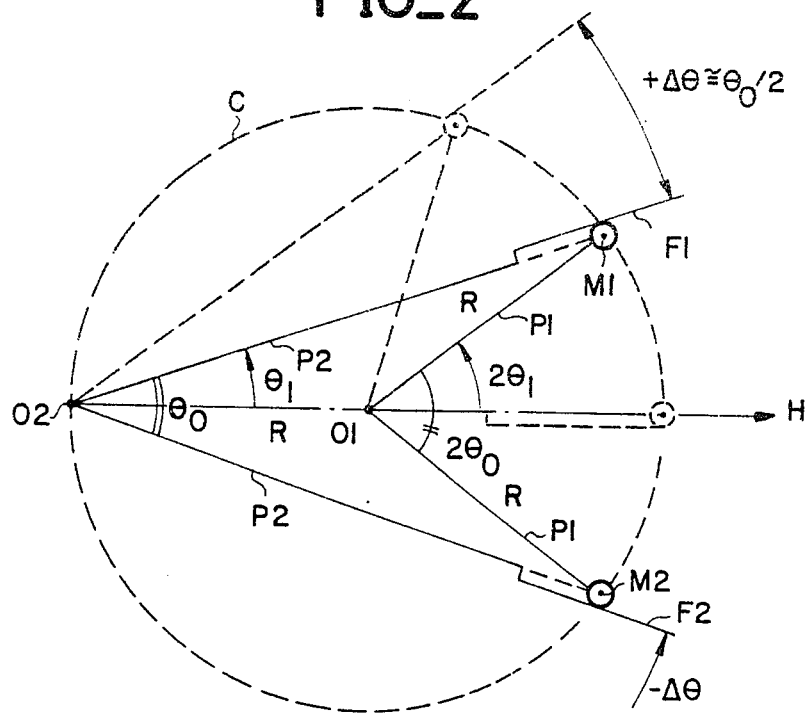
FIG_2

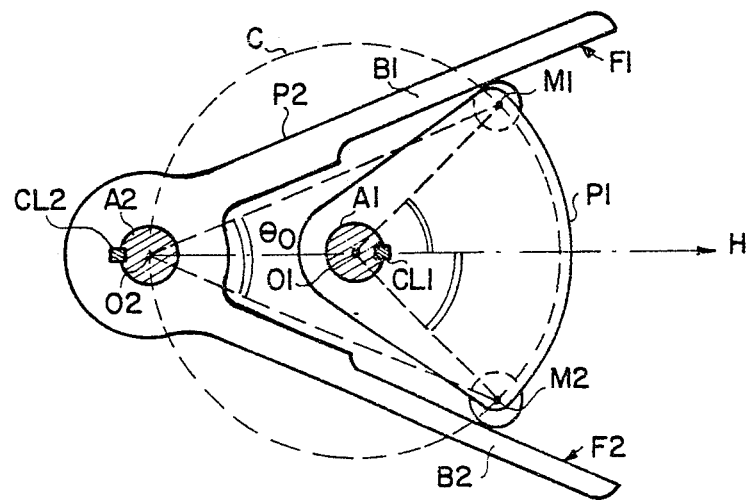
FIG_3
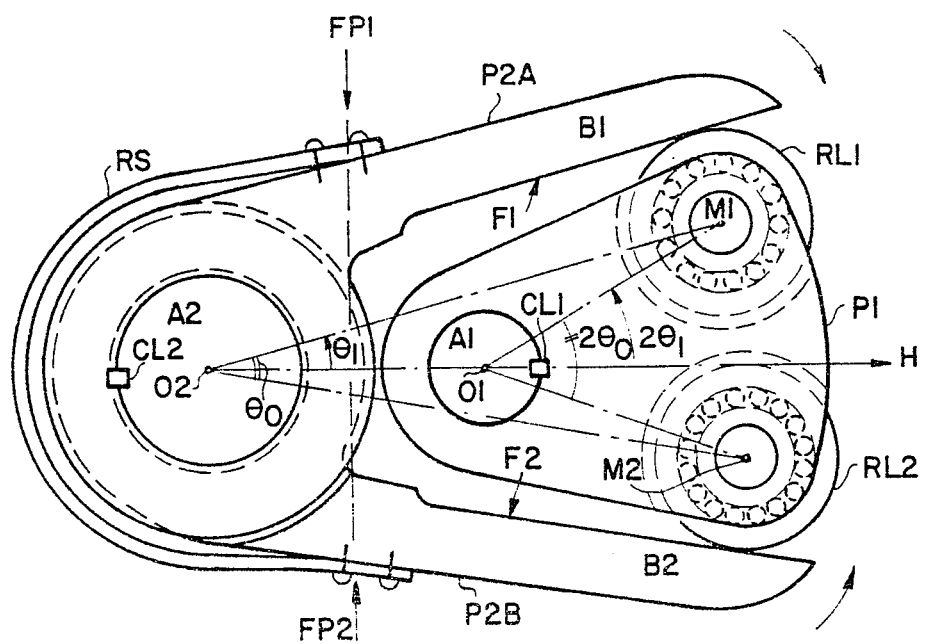
FIG_4

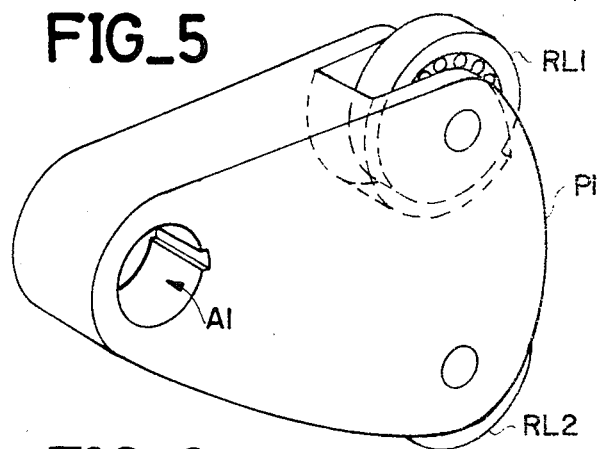
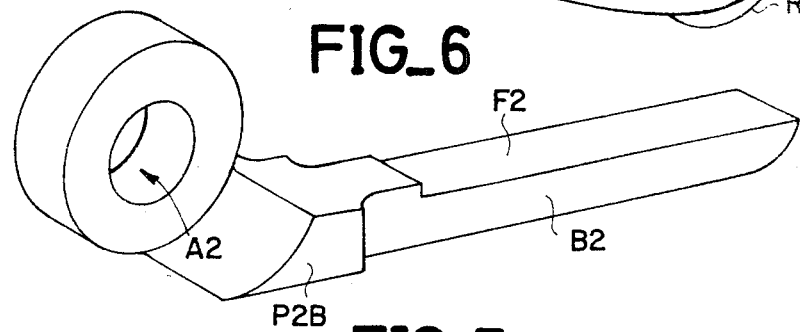
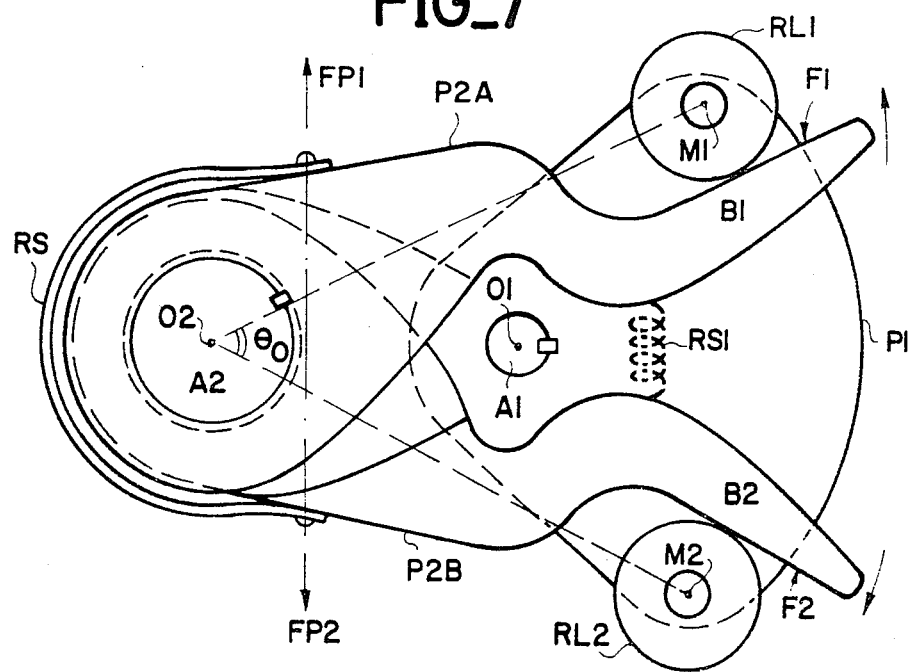

FIG_8
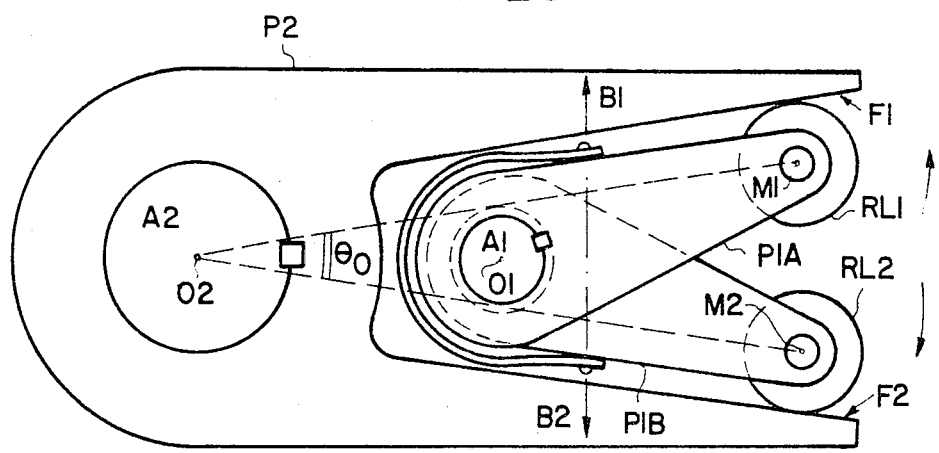
FIG_9
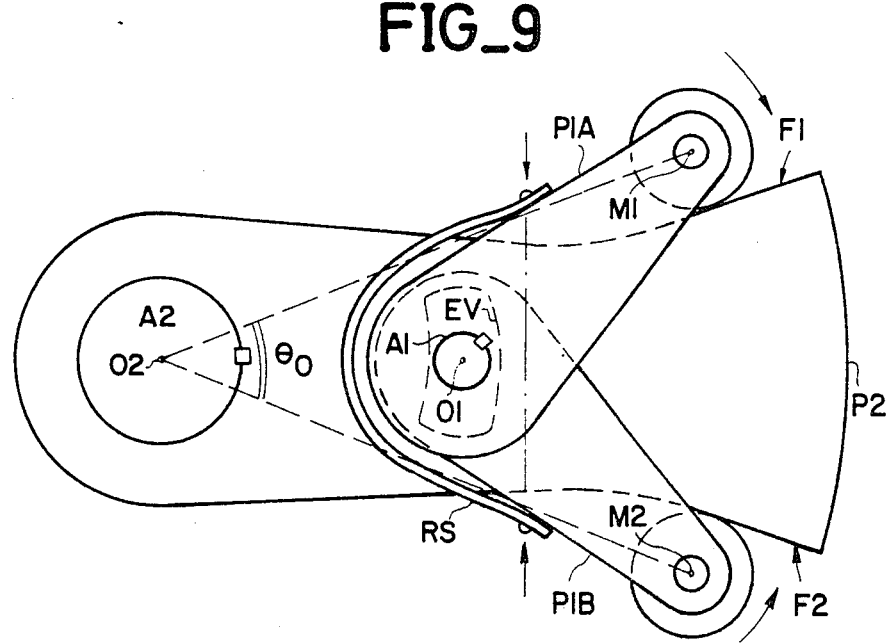

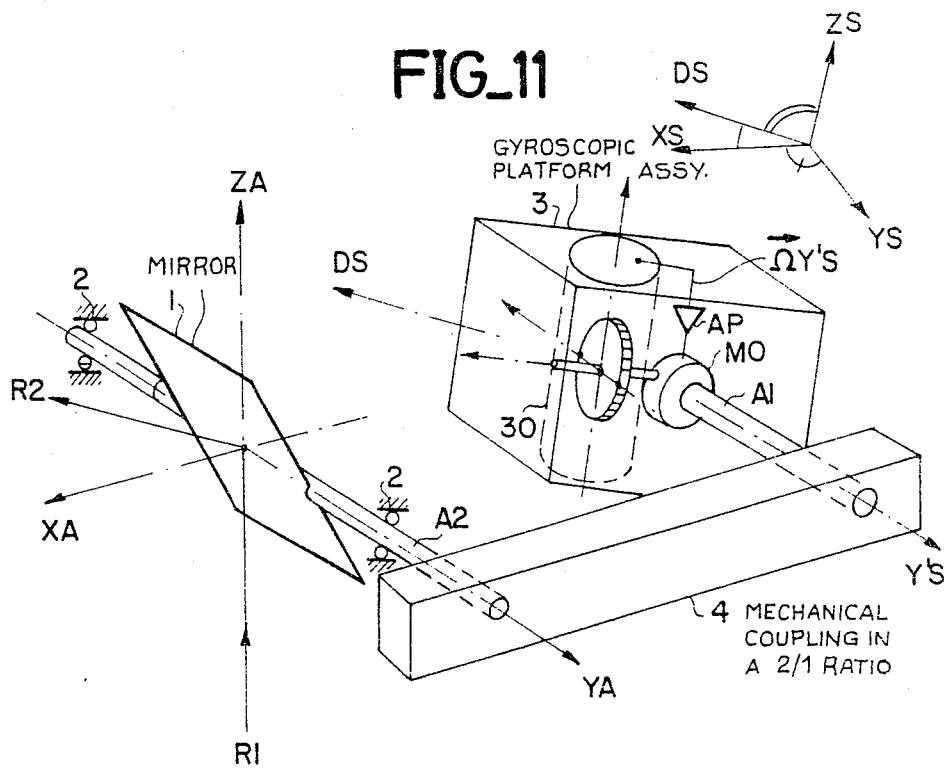
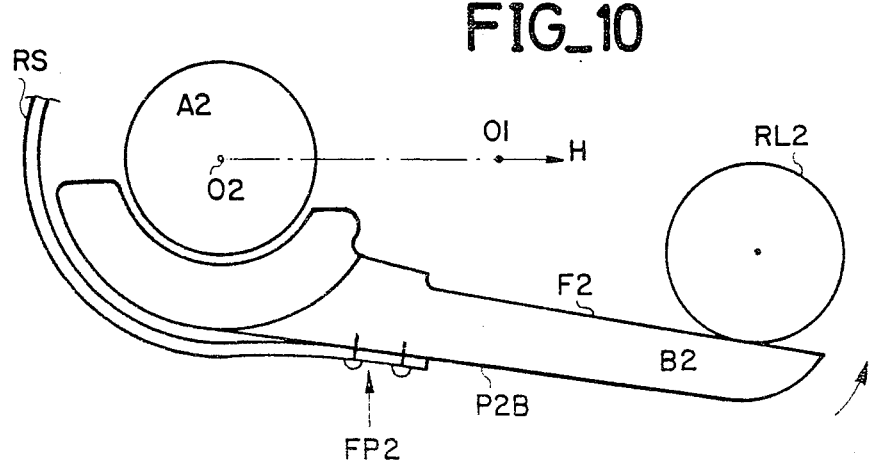

4,763,540

MECHANICAL COUPLING DEVICE FOR TWO PARALLEL SHAFTS ALLOWING ROTATION THEREOF IN A 2/1 RATIO

BACKGROUND OF THE INVENTION

The present invention relates to a device for the mechanical coupling of two parallel shafts allowing rotatin thereof in a 2/1 ratio (or 1/2 depending on the drive shaft considered).

More precisely, the invention is intended to provide conditions of relative angular rotation with high reliability between two shafts whose rotational axes are parallel but whose rotational movement is limited in a given angular sector less than the limit values $\pm \pi/2$ for the shaft whose movement is the slowest.

It is desired to attain this aim with high precision and with equipment ensuring a rigid connection, without play, with a minimum of parasite torque and very insensitive to environmental vibrations. One application is in fact contemplated in the avionics field where the airborne optronic equipment is exposed to severe vibrations.

A known technique consists in using the property of the circle according to which the angle at the center is twice the value of the corresponding inscribed angle. This technique uses an assembly derived from that of the crank plate driving a slide beam. The crank plate is reduced to a crank which is integral with a first shaft and which rotates in a defined sector, this first shaft being the one which corresponds to the angle at the center and which therefore rotates the most rapidly. The beam is formed by an arm integral with the second shaft and which has a slide in which moves the crank pin which is at the end of the crank. The distance between the axes of rotation of the parallel shafts is equal to the radius R of the circle and to the length of the crank between the first axis of rotation and the end crank pin. Under these conditions, the second shaft rotates through an angle which is half that of the rotation effected by the first shaft. This solution has the drawback of introducing play between the crank pin and the slide, or friction if this play is reduced or taken up by tighter machining; in addition, the machining of the slide may be considered as fairly delicate for improving the precision.

The aim of the invention is to overcome the drawbacks of this known solution by arranging the assembly so that it offers the technical characteristics mentioned above.

SUMMARY OF THE INVENTION

The invention provides then a device for mechanically coupling two parallel shafts together, allowing a double rotation of one with respect to the other, including a first piece integral with a first shaft rotating about a first axis of rotation, a second piece integral with a second shaft rotating about a second axis of rotation, the first piece including a first guide element situated at a distance from the first axis equal to that between the axes, the second piece being provided with a guide means with two flat faces along which said guide element moves so as to produce a double angular rotation of the first shaft with respect to the second shaft and vice versa. The device is adapted so that the first piece includes a second guide element, the first guide element bearing on a first one of the flat surfaces and the second guide element on the second flat surface which forms a constant dihedral angle with the first flat surface, the second guide element being at the same distance from the first axis of rotation as the first guide element. In a preferred embodiment one of the pieces is formed in two parts, the first part being integral with the associated shaft and the second part being mounted freely on this shaft, and a spring device is provided for acting between these two parts so as to continually maintain the guide elements in contact with the respective flat bearing surfaces. Furthermore, the guide elements are formed advantageously from ball bearings whose outer race rolls without friction on the corresponding flat bearing surface.

BRIEF DESCRIPTION OF THE DRAWINGS

The features and advantages of the present invention will be clear from the following description given by way of example with reference to the accompanying Figures which show:

FIG. 1, a diagram recalling the basic principle used in the prior solution and in the solution of the invention;

FIG. 2, a simplified diagram showing the adaptation of the basic principle to a construction in accordance with the invention;

FIG. 3, a diagram of a first embodiment of the invention;

FIG. 4, a third and improved version of the embodiment of FIG. 3;

FIG. 5 and 6, details of construction of the elements of the assembly in the embodiment of FIG. 4;

FIGS. 7, 8 and 9, other embodiments of a device in accordance with the invention;

FIG. 10, a partial diagram of a variant of construction applied to the version of FIG. 4; and, FIG. 11, a diagram of one example of use of the coupling device in accordance with the invention for stabilizing in space a sighting or illumination direction by reflection from a mirror.

DESCRIPTION OF THE PREFERRED EMBODIMENTS

Referring to FIG. 1, the parallel shafts are represented by the marks O1 and O2 of their axes of rotation, these points being situated along a reference axis H for the angular position. By R is designated the radius of circle C, the point M on the circle represents the crank pin at the end of the crank or first piece P1. The crank pin moves in a slide B which has the flat faces F1 and F2. The angular stroke is shown which such an assembly allows in one direction; it is obvious that an equivalent angular course of opposite sign is produced symmetrically with respect to axis H. The result is an angular stroke $\pm \theta M$ for piece P2 integral with the shaft of axis O2 whereas piece P1 integral with the shaft of axis O1 will have a double stroke $\pm 2\theta M$.

Referring now to FIG. 2, it can be seen that the solution of FIG. 1 is practically doubled in that the piece integral with the shaft O1 includes two guide elements M1 and M2 on the circle C and piece P2 includes the flat surfaces F1 and F2 disposed angularly at a given fixed angular value $\theta o$. The second guide element M2 is also at distance R from the center O1 and forms at the center with the first guide element M1 an angle of constant value $2\theta o$. We have similarly, for any angular movement of value $\theta 1$ about the axis O2 a rotation of twice the value $2\theta 1$ about axis O1 for the other shaft, and vice versa. In this new solution, slide G is replaced by guide elements where the two flat surfaces F1 and F2 are spaced apart from each other and so more easily machined. Furthermore, as will be seen subsequently, an associated spring device not shown continuously ensures the application of guide elements M1 and M2 on these flat surfaces. Similarly as in the case of FIG. 1, the surfaces are oriented in the direction of the axis of rotation O2 except for the shift due to the diameter of the guide elements M1 and M2 which are preferably formed by means of ball bearings as will be seen further on.

FIG. 3 shows a simplified constructional version of a device conforming to the basic principle shown in FIG. 2. Pieces P1 and P2 are each formed from a single element. Piece 1 has substantially the form of a sector ending in crank pins, or bearings, with centers M1 and M2. Piece P1 is locked onto a shaft A1 by a device CL1 such as a keying system. Piece P2 has fairly substantially the form of a pair of tongs with fixed opening corresponding to the angle $\theta o$ with two arms B1 and B2 including flat machined surfaces F1 and F2. Piece P2 is interlocked with the shaft A2 by means of a device CL2 such as a keying system.

The following Figures show preferred embodiments in which piece P1, or piece P2, is formed in two parts and in which a spring device RS is provided for holding the guide element M1 and M2 in abutment against the surfaces F1 and F2, these guide elements being formed with ball bearings RL1 and RL2 for eliminating friction losses and avoiding corresponding parasite torques.

FIGS. 4 and 7 relate to embodiments in which piece P2 is made in two parts. A first part P2A is interlocked with shaft A2 by keying CL2; it includes the arm B1 and the surface F1, the second part P2B is substantially the same as the first part except that it is not keyed to the shaft A2 and that it may therefore rotate freely about this shaft; it includes the arm B2 and the surface F2. Spring RS may be formed, for example, by means of a blade spring fixed at the ends to the base of arms B1 and B2 and acting so as to close the tongs formed by these arms. Piece P is adapted so as to receive the guide elements centered on M1 and M2 and formed by ball bearings RL1 and RL2.

FIG. 5 shows in perspective a possible construction of piece P1 of FIG. 4 in which housings are machined for receiving shaft A1 and bearings RL1 and RL2.

FIG. 6 shows one of the other two pieces, in this case piece P2B, piece P2A, being similar except from the point of view of machining the internal diameter receiving shaft A2 and the possible machining of a keying groove.

In these assemblies, the action of spring RS is represented by the forces FP1 and FP2. They tend to close the tongs formed by arms P2A and P2B in the case of FIG. 4. Since piece P2B is mounted freely rotating on shaft A2, the result is the continuous engagement with a relatively high application force of bearings RL1 and RL2 against the corresponding bearing surfaces F1 and F2, which ensures an absence of play in the assembly and reliable protection against vibrations. Since the angle $\theta o$ between the jaws is constant, the spring exerts a constant holding torque. Furthermore, since the work of the spring is zero, whatever the movement of the mechanism, it can be deduced therefrom by application of the principle of virtual work that no return torque exists when the angle $\theta 1$ varies. The bearings RL1 and RL2 may possibly be formed using pairs of prestressed bearings so as to eliminate any free motion.

The angles of rotation are limited about the position of symmetry H of the device by the constructional forms chosen, to fairly low angular values, but it is easy to transpose the construction shown and to modify it so as to allow greater movement. The value of angle $\theta o$ may be best chosen according to the total movement considered and considerations of the space occupied and of the rigidity of the mechanical components.

In the embodiment shown in FIG. 7, the flat rolling surfaces F1 and F2 are oriented outwardly instead of being oriented inwardly as in the case of FIG. 4. The bearing points of the bearings on these surfaces are inside the sector O1, M1, M2 instead of being outside, as in the preceding case. The result is a different construction of arms B1 and B2 which are further adapted so as not to come into contact with shaft A1 during the angular movement contemplated. The action of spring RS, as shown by the forces FP1 and FP2, this time tend to move the arms away from each other so as to engage the surfaces F1 and F2 on the bearings RL1 and RL2. For understanding the drawing, pieces P2A, P2B and bearings RL1, RL2 should be considered as situated in front of the sector P1 which is situated behind the plane of the Figure. Spring RS is fixed at its ends to the wide parts considered arranged as in the case of FIG. 6 so as to form a pair of tongs. The spring is in this case compressed so as to produce the forces FP1 and FP2 in appropriate directions. The spring may be designed differently, for example as shown at RS1 between arms B1 and B2. The bearings are locked onto the sector P1 by the mechanical axes on which they are mounted. To avoid parasite torques, the fastenings of the spring are in the same plane perpendicular to axis O2, the same remark can be made for the mounting of the bearings. Forces FP1 and FP2 are equal and opposite.

The following FIGS. 8 and 9 refer to other embodiments in which this time piece P2 is formed by a single element in the form of a tuning fork (FIG. 8) or substantially rectangular (FIG. 9) and it is piece P1 which is made in two parts. As before, one of these parts P1A is mounted on shaft A1 by keying CL1 wheras the second part P1B is mounted for free rotation on shaft A1 and rotates freely about the axis O1, spring RS is mounted so as to continuously apply the bearings against the bearing surfaces F1 and F2. The construction of the spring in the case of FIG. 9 is similar to those described in the preceding cases. Furthermore, in FIG. 9 it will be noted that piece P2 includes a recessed part EV which is formed so as to avoid coming into contact with shaft A1 during rotation.

Depending on the angular movement to be obtained, some of the constructions shown in FIGS. 4 to 9 may be considered as preferable to the others. Consideration should also be given to the fact that certain embodiments of pieces P1 and P2 have a greater rigidity and so a better protection against vibrations.

In addition, some forms of pieces P2 add a lower moment of inertia than others to shaft A2, which leads to a better stabilization of shaft A1.

The device described admits of numerous variants in accordance with the invention. In particular, in each of the four versions described and shown in FIGS. 4 to 9, the piece mounted for free rotation on the associated shaft, for example P2B in the version of FIG. 4, does not need to completely surround the associated shaft, A2 in this case. The force FP2 due to spring RS may be used for holding piece P2B in place, as shown in FIG. 10, which illustrates a corresponding detailed part of this version. The end of piece P2B, on shaft A2 side, only partially surrounds this shaft against which it is applied by the spring RS.

FIG. 11 relates the application of the present invention to airborne optronic equipment. Shaft A2 drives a mirror 1 about an axis YA. The direction YA is contained in the plane of the mirror. Bearings are provided for the rotation and connect the assembly to the aircraft structure 2. The direction of radiation R1 is reflected along R2, conversely. The directon R1 is considered as fixed with respect to the aircraft structure, for example that of a laser emission optical axis, or conversely of an optical axis receiving a TV image in the case of a laser objective designation system. The direction R1 may correspond to an axis ZA of the aircraft trihedron, XA representing the longitudinal axis or pitch axis and YA the transverse axis or roll axis.

For the sake of simplification, stabilization will be considered in movements about only one axis parallel to YA and YS. Supposing that it is desired to lock in a fixed direction R2 with respect to a Galilean trihedron XS YS ZS (direction represented by DS). When the aircraft turns through $-\Delta\theta$ about YA in the Galilean trihedron, the fixed direction DS rotates by $+\Delta\theta$ with respect to the trihedron of the aircraft. With a gyroscopic device 30 suitably installed on the platform 3, the angular movements are detected with respect to the Galilean trihedron of this platform about Y'S parallel to YS, by means of a control system symbolized by the amplifier AP and driven and angular detection MO elements. It is possible from these detected angular movements to rotate the platform 3 so these movements are always identically zero. Direction DS will then remain fixed in the Galilean trihedron. So that the direction R2 remains parallel to DS, the axis YA of the mirror must rotate through $$+\frac{\Delta\theta}{2}$$

with respect to the structure of the aircraft, whence the necessity of coupling the axes YA and Y'S together by means of a device 4 of the above described type which introduces a ratio of 2/1 so that the rotation of Y'S is double that of YA.

What is claimed is:

1. A device for mechanically coupling two parallel shafts together so as to allow a double rotation of one with respect to the other, comprising:
   a first piece integral with a first shaft rotating about a first axis of rotation;
   a second piece integral with a second shaft rotating about a second axis of rotation, one of said pieces being a cam and the other a following member;
   the first piece including first and second guide elements each situated at a distance from the first axis equal to that between said axes, the second piece being provided with a guide means having two flat surfaces forming a constant dihedral angle therebetween for guiding said first and second guide elements respectively therealong so as to produce a double angular rotation of the first shaft with respect to the second shaft and vice versa, said first guide element bearing on a first one of said flat surfaces and said second guide element bearing on the second flat surface, one of the pieces being made in two parts, the first part being integral with the associated shaft and the second part being freely mounted on the associated shaft; and
   spring device for acting between said two parts so as to maintain said guide elements continuously in bearing relation with the respective flat surfaces.

2. The device as claimed in claim 1, wherein said guide elements are formed by ball bearings.

3. The device as claimed in claim 1, wherein said second piece is made in two parts, the first part including the first of said flat surfaces and the second part including the second of said flat surfaces and said spring device is fixed by its ends respectively to said first and second parts of the second piece.

4. The device as claimed in claim 3, wherein the second piece has the shape of a pair of tongs whose two arms are urged together by the spring device, the first piece having the shape of a sector on which said guide elements are mounted.

5. The device as claimed in claim 3, wherein the second piece has the shape of a pair of tongs whose arms are urged away from each other by said spring device, said first piece having the form of a sector supporting said guide elements.

6. The device as claimed in claim 1, wherein said first piece is made in two parts, the first part being integral with the associated shaft and including a first guide element, the second part being freely mounted on the associated shaft and including the second guide element, and said spring device is fixed by its ends respectively to said first and second parts of the first piece.

7. The device as claimed in claim 6, wherein said second piece has the shape of a tuning fork whose arms include said flat surfaces, said spring device being operative to move the two parts of said first piece away from each other.

8. The device as claimed in claim 6, wherein said second piece has a substantially rectangular shape including the flat surfaces and said spring device is operative to draw the two parts of said first piece together.

9. The device as claimed in claim 1, used for stabilizing an optical direction reflected by a mirror with respect to a galilean trihedron, said mirror rotating about an axis connected to a structure movable in space and this axis being coupled by said device to a stabilized platform.

* * * * *